Aug. 9, 1949.          P. F. DANIELSON                2,478,374
                         SINK STRAINER
                       Filed June 10, 1947
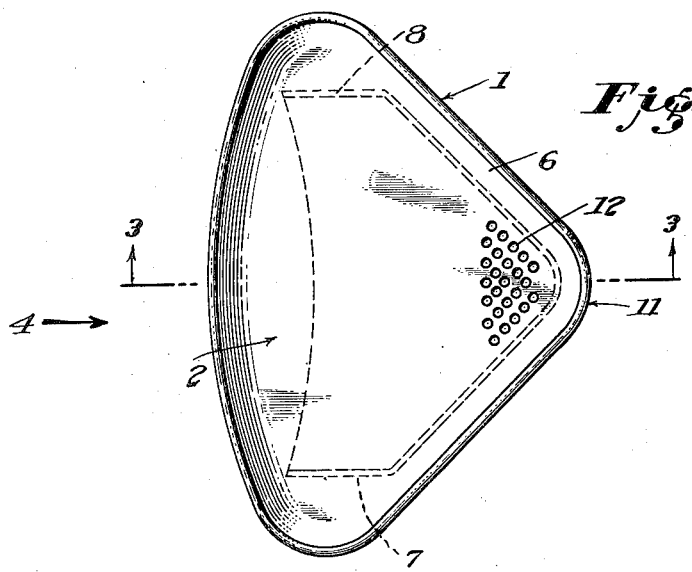
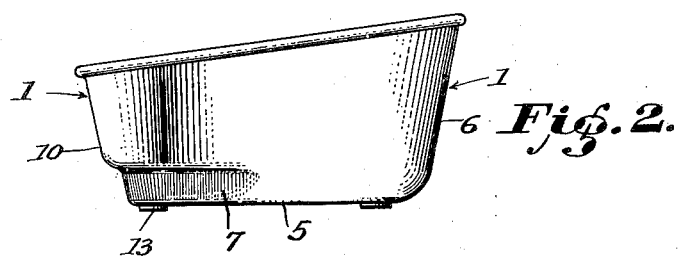
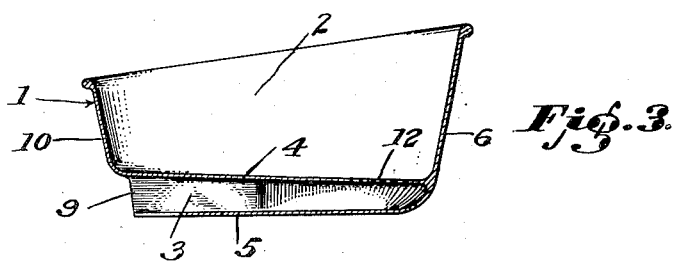
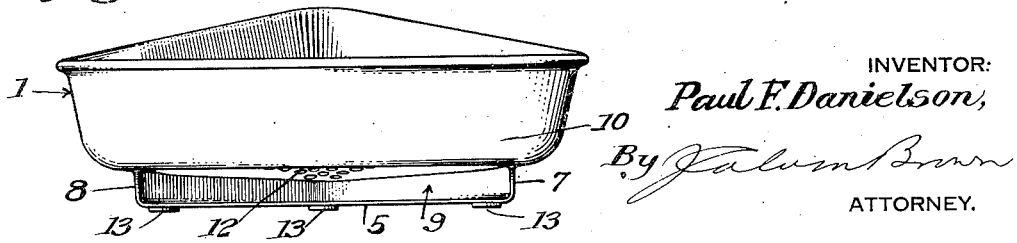
INVENTOR:
Paul F. Danielson,
By
ATTORNEY.

Patented Aug. 9, 1949

2,478,374

UNITED STATES PATENT OFFICE 2,478,374

SINK STRAINER

Paul F. Danielson, Los Angeles, Calif.

Application June 10, 1947, Serial No. 753,634

5 Claims. (Cl. 4—290)

The present invention relates to kitchen appliances, and specifically to a sink strainer.

The invention has for an object a device which prevents liquids from dripping from the strainer when it is picked up for the purpose of depositing material within the strainer into a garbage pail.

A further object of the invention is the provision of a sink strainer which will at all times drain the liquid from any refuse placed in the container, which liquid in turn is directed outwardly from the container, or may be held at a given location when the strainer is picked up.

In its simplest embodiment, the sink strainer has two container portions, to wit: an upper and a lower portion, with a wall separating said containers, which wall is perforated at a given location. The separating wall is inclined so as to direct liquids to the zone of the perforations, which liquids pass through said perforations and into the second container. This second container is arranged so that under ordinary circumstances, with the strainer resting in a sink, any liquid will pass outwardly from said second container into the sink for drainage. However, if the sink strainer is picked up, the second container will prevent any liquid from escaping therefrom.

Other objects include a sink strainer which is inexpensive in cost of manufacture, so arranged that under ordinary circumstances the perforations will not clog, and which is superior to devices now known to the inventor.

In the drawing:

Figure 1 is a top plan view of the appliance;

Figure 2 is a side elevation of the appliance shown in Figure 1;

Figure 3 is a sectional view on the line 3—3 of Figure 1; and,

Figure 4 is a view looking in the direction of the arrow 4 of Figure 1.

Referring now to the drawing:

The kitchen appliance is designated as an entirety by the numeral 1, and while said appliance may assume any configuration desired, the present appliance assumes the outline generally utilized in devices of the character of the invention, to-wit: triangular, whereby the appliance may fit within the corner of a sink. The appliance has two container portions 2 and 3, separated by a common unitary division wall 4 which forms a base for container 2 and the upper wall for container 3. Container 3 is provided with a sub-base 5 which acts as a permanent base for the appliance. A marginal wall or flange 6 surrounds wall 4 and merges in part with sub-base 5. Interconnecting the sub-base 5 and wall 4 are side flanges 7 and 8. These flanges merge with flange 6 (see Figure 1). Thus, the container 3 is provided with a mouth or open side at 9, forming an outlet for said container adjacent the heel portion 10 of the appliance 1. Wall 4 is inclined relative to sub-base 5, the inclination being toward the pointed end 11 of the appliance. The wall 4 is provided with perforations 12 adjacent the end 11.

The operation, uses and advantages of the invention are as follows:

The triangular form permits the appliance to be placed in the corner of a sink, and when waste products are placed within the appliance, any water or other liquid will drain toward the perforations 12 due to the inclination of the wall 4. The liquid will pass through the perforations 12 and into the container 3. Ordinarily, the liquid will pass outwardly of container 3 at opening 9 thereof, and into the sink. In fact, the appliance may be tipped on the sub-base 5 by depressing the heel portion 10 thereof to assure that the liquid will pass from the container 3. However, if the liquid is not removed, the heel portion of the flange 6 may be grasped, which will incline the pointed end 11 downwardly away from the open side 9, thus retaining the liquid within the container 3 until the contents of said container 2 are deposited in the garbage pail, followed by tipping the appliance to remove the liquid from the container 3 through opening 9. In this connection, it will be observed that the flange 6 is of varying height, the greatest height being at the apex portion 11 of the container. This construction assures that when the container is grasped at the heel portion of the flange 6 to carry the contents thereof to a garbage pail, the material, together with any liquid, will remain in the container without spilling.

It will be seen that the invention has no movable parts, may be molded in a simple manner from various materials, has an attractive appearance, and affords protection from dripping which the ordinary sink strainer does not provide for. Furthermore, the average sink strainer, unless it has a reinforced bottom or base, has a tendency to sag after it has been used over a period of time, and particularly where hot water has been poured within it. The present invention assures that deflection or warpage of any character in the wall 4 will not affect the operation of the strainer, as the perforations are spaced a substantial distance above the sub-base. As a consequence, a strainer of the type of the present invention may be used over a longer period of time than the ordinary strainer.

The drawing illustrates the invention as having a sub-base provided with feet in the form of rubber discs or other material 13, for maintaining the sub-base in a sanitary condition. It will be observed from Figure 2 that, in side elevation, the spacing between the rim of the container and the sub-base is substantially equal throughout the appliance. This adds to the ornamental appearance of the device.

I claim:

1. A sink strainer including an open top upper container, an open side lower container forming a permanent base for the strainer, a common unitary division wall between said containers, and drainage means through said wall at a point removed from the open side of the lower container to retain drippings therein when the strainer is tilted away from the open side.

2. A sink strainer including an open top upper container, an open side lower container forming a permanent base for the strainer, a common unitary division wall between said containers inclined toward a portion of the lower container opposite the open side, and drainage means in the division wall in a zone furthest removed from the open side.

3. A sink strainer including an open top substantially triangular shaped container, an open side lower container of substantially similar shape forming a permanent base for the strainer, a common unitary division wall between said containers inclined downwardly toward a corner of the lower container opposite the open side, and said division wall formed with a plurality of drainage perforations in the lowest portion thereof.

4. A sink strainer including an open top substantially triangular shaped container, an open side lower container of substantially similar shape forming a permanent base for the strainer, a common unitary division wall between said containers inclined downwardly toward a corner of the lower container opposite the open side, the adjacent sides of the upper container and said corner merging into the side walls and corresponding corner of the lower container, and the lowest portion of the unitary division wall between the containers having a plurality of drainage openings therethrough.

5. A sink strainer including an open top substantially triangular shaped container, an open side lower container of substantially similar shape forming a permanent base for the strainer, a common unitary division wall between said containers inclined downwardly toward a corner of the lower container opposite the open side, the lowest zone of said wall having a plurality of drainage perforations therethrough, and the upper marginal edge of the upper container inclined upwardly toward the corner in which the drainage perforations are positioned.

PAUL F. DANIELSON.

REFERENCES CITED

The following references are of record in the file of this patent:

UNITED STATES PATENTS

| Number | Name | Date |
| --- | --- | --- |
| 219,988 | Scott | Sept. 23, 1879 |
| 1,984,524 | Ebert et al. | Dec. 18, 1934 |
| 2,323,283 | Sadler | June 29, 1943 |